Sept. 15, 1970  HIYOSHI TATSUNO  3,528,296
SPEED METER WITH MEANS TO INDICATE INSTANTANEOUS VEHICULAR
SPEED AND REGISTER MAXIMUM SPEED
Filed March 29, 1968  3 Sheets-Sheet 1

INVENTOR
HIYOSHI TATSUNO
BY
Mullin & Siegel
Att'ys.

INVENTOR
HIYOSHI TATSUNO
BY
Mullen & Suggel
ATT'YS.

Sept. 15, 1970  HIYOSHI TATSUNO  3,528,296
SPEED METER WITH MEANS TO INDICATE INSTANTANEOUS VEHICULAR
SPEED AND REGISTER MAXIMUM SPEED
Filed March 29, 1968  3 Sheets-Sheet 3

INVENTOR
HIYOSHI TATSUNO
BY
Mullen & Siegel
ATT'YS

United States Patent Office
3,528,296
Patented Sept. 15, 1970

3,528,296
SPEED METER WITH MEANS TO INDICATE INSTANTANEOUS VEHICULAR SPEED AND REGISTER MAXIMUM SPEED
Hiyoshi Tatsuno, 3-10-8 Minami-Azabu Minato-ku, Tokyo, Japan
Filed Mar. 29, 1968, Ser. No. 717,181
Claims priority, application Japan, Sept. 30, 1967, 42/83,332
Int. Cl. G01p 15/04
U.S. Cl. 73—491                          5 Claims

ABSTRACT OF THE DISCLOSURE

A speed meter for a vehicle having an instantaneous speed indicator, which is actuated by an axle of a vehicle through a gearing means and a maximum speed pointer to register the maximum speed assumed by the vehicle in each trip. The maximum speed pointer is associated with a lock means and a reset means. The lock means locks said pointer at a position corresponding to the maximum speed regardless of the instantaneous speed even when the vehicle comes to a stop, while the reset means resets the pointer only when the vehicle speed increases to a certain predetermined level.

---

This invention relates to a speed meter, and more particularly to a speed meter mounted on the outside of a vehicle which is adapted to indicate instantaneous running speed thereof in such a manner that a third person outside the vehicle can ascertain the indication and to register the maximum speed so as to enable the recognition of the maximum running speed of each trip of the vehicle at the end thereof.

Generally speaking, to drive a vehicle safely on a street, each driver had better know the speed of a vehicle moving in front of him, so that the driver can control his vehicle speed properly with accurate knowledge on the speed of the preceding vehicle. Thereby, traffic accidents due to inaccurate estimate of the speed of the preceding car can be prevented, and also, more vehicles can move through a street having a predetermined width within a time unit, to improve the efficiency of the transportation network and to increase the transportation capacity thereof. It is also well known that a large part of traffic accidents on highways are caused by violation of the speed limit by drivers.

If speed indicator is mounted on the outside of each vehicle in addition to regular speed meter on dashboard, so as to indicate the instantaneous running speed of the vehicle in a manner recognizable by a person outside the vehicle, then drivers of the following vehicles can adjust properly their vehicle speed with more exact knowledge on the speed of the preceding vehicles. Besides, the driver of the vehicle with the indicator will be psychologically forced to control his vehicle speed more carefully. For such purposes, various indicators of instantaneous vehicle speed have heretofore proposed, which can be mounted on the rear end, roof or bumpers of the vehicle.

Speed indicators, which have been proposed heretofore, give indications of only the instantaneous speed; namely, as the running speed of a vehicle decreases from a certain maximum speed, the indication of the indicator also decreases, until zero speed indication is reached when the vehicle comes to stop. Such indicators are useful for providing the drivers with accurate information on the running speed of their preceding vehicles. However, such indicators have a disadvantage in that even if a vehicle runs at a speed in excess of a given allowable maximum speed at least a certain moment, the fact of running at such an excessively high speed is not recorded, because as the vehicle slows down the indicator shows only the correspondingly lower instantaneous running speed. In other words, such conventional speed indicators are not effective for prevention of traffic speed violation and for prevention of traffic accidents caused by such excessive running speed.

Therefore, a principal object of the present invention is to obviate or overcome the aforesaid difficulties of conventional speed indicators by providing an indicator capable of both indicating the instantaneous speed and registering the maximum speed.

An object of the present invention is to provide a speed meter to be mounted on the outside of a vehicle to indicate instantaneous speed thereof in a manner recognizable by outside persons, such as pedestrians and other drivers, and to register the maximum speed assumed by the vehicle in each particular trip thereof.

Another object of the present invention is to provide speed meter mounted on the outside of a vehicle having means to indicate instantaneous speed thereof, which indicates zero speed when the vehicle comes to stop, and a maximum speed pointer which can be reset only after the vehicle speed increases from a restarting zero speed to a predetermined level. Thus, the maximum running speed of each vehicle for each trip can be easily checked, thereby traffic speed limit violation can be effectively detected, so as to psychologically force the drivers to restrain from excessive driving speed.

Other objects and a fuller understanding of the present invention can be had by referring to the following description taken in conjunction with the accompanying drawings, in which.

Figure 1:
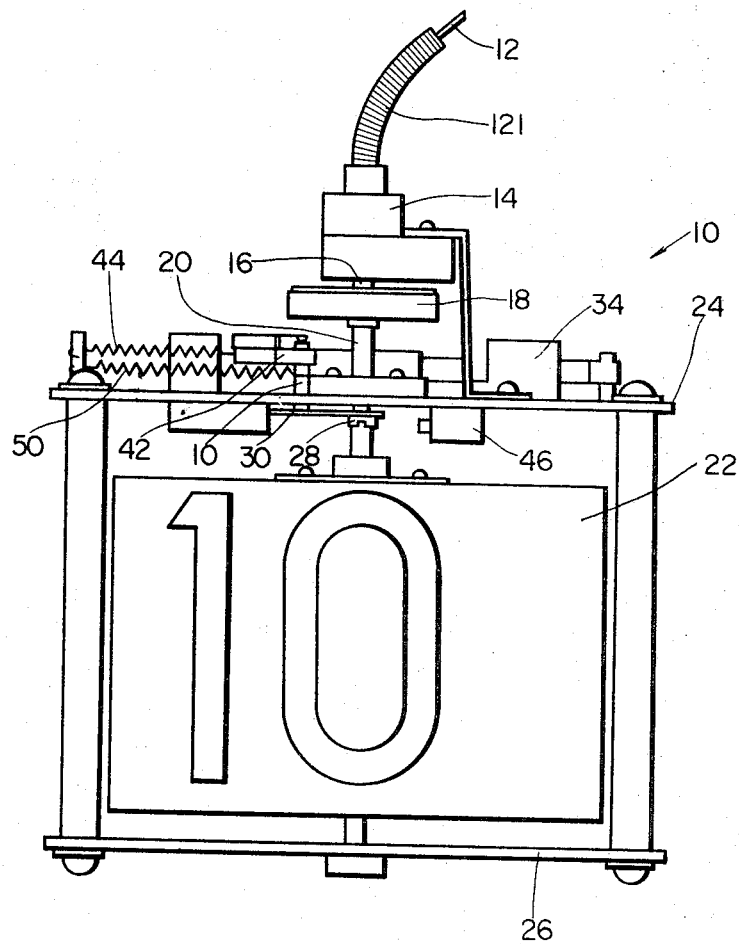
FIG. 1 is a schematic front view of a speed meter according to the present invention, illustrating construction thereof.

Referring to FIG. 1, a speed meter to be mounted on the outside of a vehicle, according to the present invention, which is generally designated by a numeral 10, is connected to a transmission (not shown) of the vehicle through a suitable connecting means 12, such as a flexible wire, covered by a protective conduit 121. The transmission is also associated with a conventional inside speed meter mounted on the dashboard. The rotation of an axle of the vehicle is transmitted to a rotary shaft 16 through a mounting member 14 of the speed meter.

The rotation of the shaft 16 is converted into an angular displacement of another rotary shaft 20, by means of a suitable converter 18, e.g. a magnetic or frictional converting device. The magnitude of the angular displacement of the shaft 20 is proportional to the revolving speed of the axle and the maximum angular displacement is preferably limited to about a full revolution. The shaft 20 extends between a top lid 24 and a bottom plate 26, to act as the axis of a speed indicating drum 22.

Figure 2:
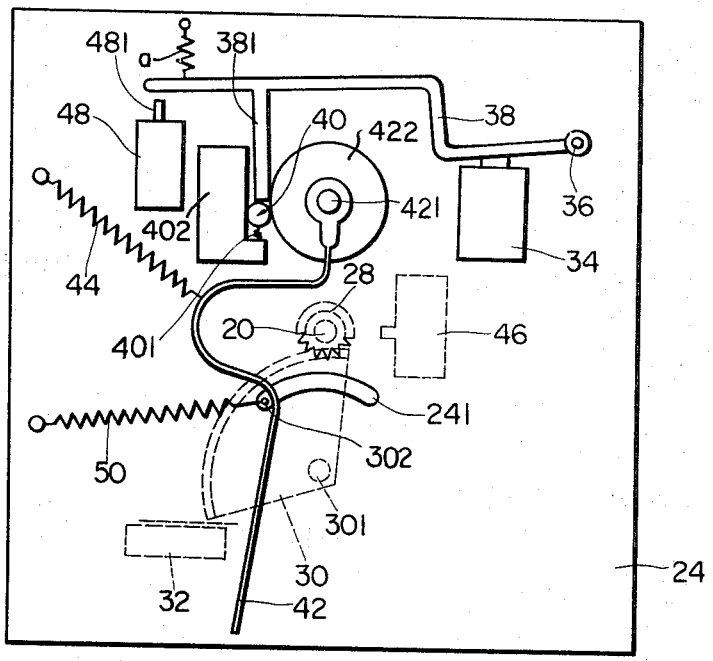
FIG. 2 is a schematic plan view of the speed meter of FIG. 1.

Referring to FIG. 2, a gear 28 is coaxially secured to the shaft 20 and engages a sector gear 30, which is pivotally mounted on the lid 24 by a pin 301. The sector gear 30 has a stud 302 integrally secured thereto so as to extend through an arcuate slot 241 bored on the lid 24. The figure shows the speed meter in the state corresponding to a vehicle at a stop with a pointer 42 located at a reset position. Then, the gear 28 secured to the shaft 20 engages with one end of the sector gear 30, while the opposite end of the sector gear is kept in contact with the actuating lever of a microswitch 32 to close or turn "ON" the microswitch. With the microswitch 32 thus turned "ON" an electromagnet 34 is energized to attract a lever 38. In this case, however, an arm 381 secured to the lever 38 cannot release a lock means 40 for the maximum speed indicating pointer 42, since a stopper rod 481 of a solenoid 48 remains in projected position thereof on the ground with a microswitch 46 is not yet opened. As shown in FIG. 2, the lock means 40 may be in the form of ball, such as a steel ball which remains in position by a pressure spring 401, abutting means 402 and a disc or reel like member 422, and which is secured to the pointer 42 and serves to lock the disc 442 with the frictional force between the ball and the disc so as not to return the pointer 42 to its initial or starting position by the elastic force of a spring 44, when the vehicular speed increases beyond a predetermined level.

When the vehicle starts to move, the shaft 20 rotates, and the sector gear 30 moves clockwise as viewed in FIG. 2 by the engagement of its teeth with the gear 28 secured to the shaft 20. One end of the sector gear 30 opens the microswitch 46 and deenergizes the solenoid 48. The stopper rod 481 is then retracted and thus the lever 38 is attracted against the elastic force of a spring $a$ by the electromagnet 34 to release the lock means 40 with the arm 381 of the lever 38. When the running speed of the vehicle reaches a predetermined one, the microswitch 32 is opened to deenergize the electromagnet 34 and thus the lever 38 shall return to its waiting position by the spring means $a$.

As the sector gear 30 rotates clockwise, the stud 302 secured to the sector gear 30 also moves clockwise along the slot 241 against the elastic force of a bias spring 50. As a result the pointer 42 is urged counterclockwise against the elastic force of the bias spring 44, to move the pointer to a position corresponding to the highest speed achieved by the vehicle. When the vehicle slows down from the highest speed thus achieved, the output from the converter 18 is reduced, and the biasing spring 50 pulls the stud 302 of the sector gear 30 in a counterclockwise direction, so that the axis 20 of the indicator drum 22 is turned clockwise by the engagement between the sector gear 30 and the gear 28 secured to the axis 20. Thereby, the indication given by the indicator drum 22 becomes smaller as the actual speed of the vehicle which becomes lower. When the vehicle stops, the indicator drums shows zero speed.

When the running speed of the vehicle reaches a predetermined one, the one end of the sector gear 30 clears the microswitch 46 to close the same. Therefore, the stopper rod 481 of the solenoid 48 will be projected, whereby the arm 381 of the lever 38 cannot release the lock means 40, even if the electromagnet 34 is energized by closing the microswitch 32 with the other end of the sector gear 30, when the running speed of the vehicle is reduced below the predetermined speed.

With the speed meter of the aforesaid construction, which is mounted on the outside of a vehicle, according to the present invention, the maximum running speed of a vehicle during each trip thereof can be detected from the outside of the vehicle, because the maximum speed pointer indicates the maximum speed of each trip even after the vehicle comes to stop. Even if the vehicle runs at a high speed in a moment, the pointer 42 indicates the very maximum speed reached, without any failure.

When the vehicle starts to move again and its running speed increases to a certain level, as will be described hereinafter referring to FIGS. 3 and 4, the microswitch 46 is turned off to pull back the stopper rod 481. The circuit of the microswitch 32 is such that the electromagnet 34 is then energized, to attract the lever 38 to release the locking means 40 by the arm 381 integrally formed on the lever 38. Upon release of the lock means 40, the pointer 42 is turned clockwise by the bias spring 44 to its reset position.

Figure 3:
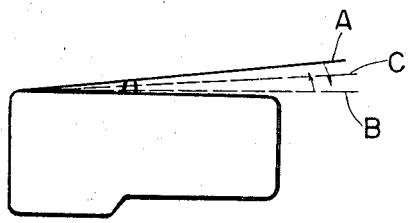
FIG. 3 is a diagrammatic illustration of a microswitch, usable in the speed meter.
Figure 4:
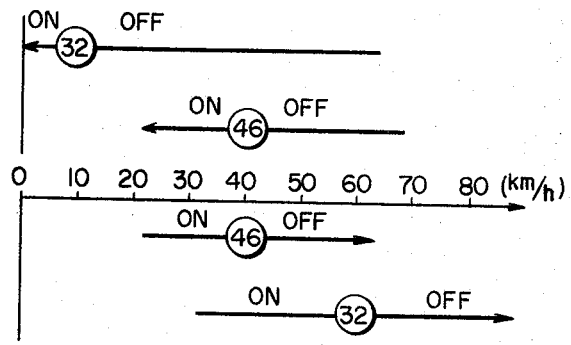
FIG. 4 is a graph showing the manner in which the time setting of microswitches used in a speed meter according to the present invention is selected.

Referring to FIG. 3, the differential travel of a plunger of a microswitch, which is normally 0.01 to 0.05 mm., can be magnified to 0.5 to 2.0 mm. by using a leaf or lever type microswitch, so that its lever can assume three positions; namely, a normal position A, as ON position B, and an OFF position C. The differential travel is also referred to as the sensitivity of the microswitch.

By using a suitable lever type or leaf type microswitch, it is possible to operate the microswitch 32 in the following manner; namely when the vehicular speed increases from a zero speed, the contact of the microswitch 32 remains closed or ON until the vehicular speed reaches 60 km./hr. and remains open or OFF for all speeds higher than 60 km./hr.; while when the vehicular speed decreases, the microswitch 32 remains open or OFF until the vehicular speed decreases as low as 10 km./hr. and remains closed or ON for all the speeds lower than 10 km./hr. If a highly sensitive microswitch is used for the switch 46, then the microswitch can be kept closed or ON for all speeds below 40 km./hr. and kept open or OFF for all other speeds. Such setting of the operative characteristics of the microswitches 32 and 46 is shown in FIG. 4.

With such setting of the microswitches, it is apparent to those skilled in the art that as a vehicle having a speed indicator according to the present invention starts moving, the maximum speed pointer 42 remains at a position corresponding to the maximum speed of the preceding trip as long as the vehicular speed is below 40 km./hr., because the microswitch 46 is kept closed to keep the locking means 40 in the state as locked by projecting the stopper rod 481. As soon as the vehicular speed increases to 40 km./hr., the microswitch 46 is turned OFF or opened to draw back the stopper rod 481 to release the lever 38, and at this speed level of 40 km./hr., the other microswitch 32 is kept closed or ON, and hence, the lever 38 is turned counter-clockwise by the electromagnet 34 energized through a circuit including the microswitch 32. Thus, the locking means 40 is released, so as to reset the maximum speed pointer 42 to its starting position from the aforesaid position corresponding to the maximum speed of the preceding trip. If the vehicular speed is maintained below 60 km./hr., the microswitch 32 keeps the electromagnet 34 energized to release the locking means 40, and hence, the maximum speed pointer 42 follows both the increase and decrease of the vehicular speed without being locked at any point, but the microswitch 46 shall be turned ON to cause the projection of the stopper rod 481, when the vehicular speed is reduced below a level of 40 km./hr. and thus, in this case, the pointer 42 shows the speed of 40 km./hr. On the other hand, as soon as the vehicular speed increases beyond a level of 60 km./hr., the microswitch 32 is turned OFF or opened to de-energize the electromagnet 34. Thus, the locking means 40 is locked. As a result, the pointer 42 is allowed to move only in a counterclockwise direction or to respond only to speed increase, because a spring 401 of the lock means 40 keeps the lever 38 at the locked position.

Then, as the vehicular speed decreases from the thus increased high level, the microswitch 46 is ON or closed as soon as the vehicular speed becomes 40 km./hr., so as to reinforce the locking of the lock means 40 by projecting the stopper rod 481. When the vehicle slows down to a speed 10 km./hr., the other microswitch 32 is turned ON or closed, as shown in FIG. 4, so as to energize the electromagnet 34. However, at this moment, the rod 481 is projected to keep the lever 38 at a position departed from locking mechanism 40 so as to maintain the mechanism in its locked position. Thus, the maximum pointer 42 remains at the position corresponding to the maximum speed assumed by the vehicle in the current trip.

Even when the vehicle comes to a complete stop, the lever 38 cannot be pulled by the electromagnet 34, due to the projected stopper rod 481.

In short, by proper selection of the types of the microswitches 32 and 46, it is possible to reset the maximum speed indicating pointer 42 only when the vehicular speed increases to 40 km./hr. or more, and to actuate the maximum speed pointer for vehicular speeds higher than 60 km./hr. In other words, with proper setting of the microswitches, the speed meter 10 registers only and all the maximum speed in excess of a certain predetermined level, such as 60 km./hr.

Figure 5:
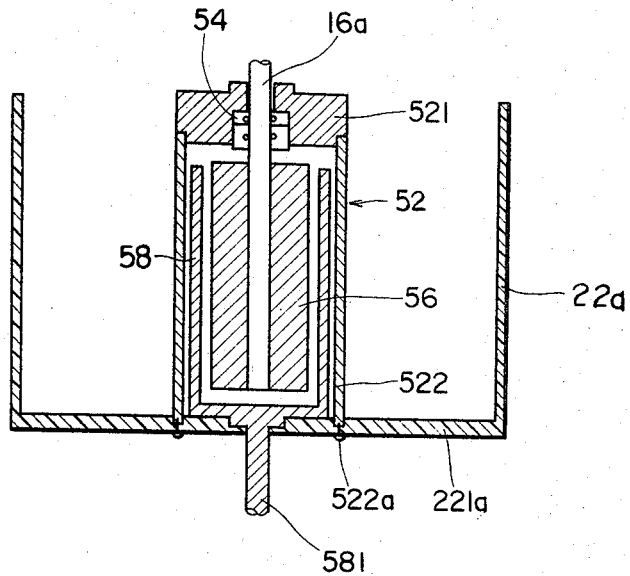
FIG. 5 is a schematic sectional view showing one embodiment of mechanism to connect a vehicle axle to the speed meter according to the present invention.

FIG. 5 shows an example of a means to connect the speed meter 10 to an axle (not shown) of a vehicle, which means can be mounted within a speed indicating drum 22a in a very compact fashion. A converter 52 of this embodiment is connected to the axle of the vehicle through an intermediate shaft 16a, which is supported by a bearing member 54 mounted on a lid 521 of the converter 52. A magnetic member 56 is mounted at the lower end of the intermediate shaft 16a. A housing 522 of the converter 52 can be secured to a speed indicating drum 22a by fastening the lower end 522a of the housing to the bottom wall 221a of the drum 22a by a suitable means, such as screws. A cylindrical member 58, which is made of magnetic material, is desposed between the magnetic member 56 and the housing 522. Another shaft 581 is secured to the lower end of the cylindrical member 58 in a coaxial fashion. Thus, the revolving speed of the intermediate shaft 16a is converted into an angular displacement of the shaft 581, by properly selecting the magnetization of the magnetic member 56 and the gap betweeen the magnetic member 56 and the cylindrical member 58. It is preferable to represent the maximum measurable vehicular speed by a full rotation of the shaft 581. By mounting a gear 28 on the shaft 581, a control circuit similar to that of FIG. 2 can be easily constructed.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A maximum speed indicator apparatus for connection to a device that converts the revolving speed of a vehicle axle into an angular displacement of a speed indicator shaft by an amount substantially less than a full rotation thereof, said maximum speed indicator apparatus comprising an input means connected to the speed indicator shaft, a pointer means operatively coupled to said input means and mounted to rotate in a first direction to indicate increasing speed of the vehicle axle and in a second direction to indicate decreasing speed of the vehicle axle, locking means operatively coupled to said pointer and having a locked position permitting movement of said pointer only in said first direction and a release position accommodating movement of said pointer in both of said directions, release means movably mounted selectively to engage the locking means to place said locking means in its release position, a first means operatively positioned with respect to said input means to force said release means toward engagement of said locking means only at speeds below a first predetermined speed on increase of speed and a lower predetermined speed on decrease of speed, after said first predetermined speed is exceeded, and override means positioned with respect to said input means to override said first means to prevent said release means from engaging said locking means at speeds below a third predetermined speed intermediate said two previously-mentioned speeds.

2. The maximum speed indicator apparatus set forth in claim 1, wherein said release means includes a lever having an arm projecting therefrom for selectively engaging said locking means to place said locking means in its release position; said first means includes a first electromagnetic device energizable to move said lever to carry said arm into engagement with said locking means, and a normally-open first switch positioned adjacent to said input means and electrically connected to said first electromagnetic device and having a closed condition to energize said first electromagnetic device, said first switch being closed by said input means when the speed of said axle is increasing and is less than said first predetermined speed and when the speed of said axle is decreasing and is less than said lower predetermined speed; and said override means includes a second electromagnetic device energizable to project a rod thereof to engage said lever and prevent said arm from moving into engagement with said locking means, and a normally-closed first switch positioned adjacent to said input means and electrically connected to said second electromagnetic device and having a closed position to energize said second electromagnetic device, said second switch being closed by said input means to energize said second electromagnetic device when the speed of said axle is less than said third predetermined speed.

3. The apparatus set forth in claim 1, wherein said input means includes a first gear secured to said speed indicator shaft, and a second gear meshed with said first gear and carrying a stud for moving said pointer means.

4. The apparatus as claimed in claim 3, wherein said locking means comprises a ball means. a spring means, a stationary member and a drum member to which said pointer means is secured, whereby the pointer means is locked in a position moved by said stud, with the aid of said ball means to be engaged frictionally between said members by said spring means.

5. The apparatus as claimed in claim 3, wherein said release means comprises a lever means having an arm projected therefrom, said lever means being controlled by an electromagnetic means so as to place said locking means in its locked and release position.

References Cited

UNITED STATES PATENTS

| 1,092,828 | 4/1914 | Duncan | 73—491 |
| 925,814 | 6/1909 | Jones | 116—129 |
| 1,755,184 | 4/1930 | Martinet | 73—491 |
| 3,041,997 | 7/1962 | Hartwell | 116—129 |
| 3,247,724 | 4/1966 | Powell | 73—519 |
| 3,394,585 | 7/1968 | Westby et al. | 73—518 |

JAMES J. GILL, Primary Examiner

H. GOLDSTEIN, Assistant Examiner

U.S. Cl. X.R.

116—129